United States Patent
Takagi et al.

(10) Patent No.: US 11,967,121 B2
(45) Date of Patent: Apr. 23, 2024

(54) DIFFERENCE DETECTION APPARATUS AND DIFFERENCE DETECTION PROGRAM

(71) Applicant: NIPPON TELEGRAPH AND TELEPHONE CORPORATION, Tokyo (JP)

(72) Inventors: Motohiro Takagi, Musashino (JP); Kazuya Hayase, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 495 days.

(21) Appl. No.: 17/282,112

(22) PCT Filed: Oct. 3, 2019

(86) PCT No.: PCT/JP2019/039074
§ 371 (c)(1),
(2) Date: Apr. 1, 2021

(87) PCT Pub. No.: WO2020/071472
PCT Pub. Date: Apr. 9, 2020

(65) Prior Publication Data
US 2021/0375006 A1 Dec. 2, 2021

(30) Foreign Application Priority Data
Oct. 4, 2018 (JP) .................. 2018-189513

(51) Int. Cl.
*G06T 9/00* (2006.01)
*G06N 3/08* (2023.01)
(Continued)

(52) U.S. Cl.
CPC .............. *G06T 9/002* (2013.01); *G06N 3/08* (2013.01); *H04N 19/137* (2014.11);
(Continued)

(58) Field of Classification Search
CPC ........ G06T 9/002; H04N 7/18; H04N 19/137; H04N 19/159; H04N 19/176; H04N 19/60;
(Continued)

(56) References Cited

U.S. PATENT DOCUMENTS

2010/0142619 A1* 6/2010 Suzuki ................. H04N 19/107
348/E7.003

FOREIGN PATENT DOCUMENTS

GB 2542118 A * 3/2017 ........... G06T 7/0002
JP 201762776 A 3/2017

OTHER PUBLICATIONS

Daichi Tashiro et al., Accurate change detection between aerial images by removing vegetation area, IEICE General Conference, 2018.
(Continued)

*Primary Examiner* — Edward F Urban
*Assistant Examiner* — Wassim Mahrouka
(74) *Attorney, Agent, or Firm* — Harness, Dickey & Pierce, P.L.C.

(57) ABSTRACT

A difference detection device includes a difference detection unit configured to, based on association among a first image and a second image captured at different times and illustrating a substantially identical space and encoding information of each of the first image and the second image, detect difference between a third image and a fourth image captured at different times and illustrating a substantially identical space, and the encoding information is information acquired from data including the first image encoded and data including the second image encoded, before inverse transform processing is executed in decoding processing executed on each of the first image and the second image.

7 Claims, 10 Drawing Sheets

(51) Int. Cl.
*H04N 19/137* (2014.01)
*H04N 19/159* (2014.01)
*H04N 19/176* (2014.01)
*H04N 19/60* (2014.01)

(52) U.S. Cl.
CPC ......... *H04N 19/159* (2014.11); *H04N 19/176* (2014.11); *H04N 19/60* (2014.11)

(58) Field of Classification Search
CPC .. H04N 19/136; H04N 19/172; H04N 19/103; H04N 19/537; G06N 3/08; G06N 3/045; G06N 3/84
See application file for complete search history.

(56) References Cited

OTHER PUBLICATIONS

Kazuya Hayase et al., Difference estimation between satellite images using image coding information, Proceedings of the 2017 Winter Games of the Institute of Image Information and Television Engineers, 2017, p. 1.

* cited by examiner

DIFFERENCE DETECTION APPARATUS AND DIFFERENCE DETECTION PROGRAM

CROSS-REFERENCE TO RELATED APPLICATIONS

This application is a 371 U.S. National Phase of International Application No. PCT/JP2019/039074 filed on Oct. 3, 2019, which claims priority to Japanese Application No. 2018-189513 filed on Oct. 4, 2018. The entire disclosures of the above applications are incorporated herein by reference.

TECHNICAL FIELD

The present invention relates to a difference detection device and a difference detection program.

BACKGROUND ART

Recently, technologies of detecting difference between images captured at different times and illustrating an identical space have become popular. For example, when a new building or road is created on the ground, an image of the new building or the like, which is captured by an artificial satellite or the like is detected as difference (change region) between images. When a map is updated based on a captured image of the ground, a large number of captured images of the ground are sometimes manually compared to manually detect an image of a new building or the like created on the ground.

However, when difference between a large number of images is manually detected, high time and manpower costs are needed. Thus, a technology of detecting difference between images by a difference detection device by using a neural network has been disclosed (refer to Non-Patent Literature 1).

In a method disclosed in Non-Patent Literature 1, the difference detection device classifies images of a building, a plant, and a road in two images captured at different times and illustrating an identical space into a building class, a plant class, and a road class. The difference detection device generates mask images of a building based on images classified into the building class. The difference detection device detects an image of a new building by detecting difference between the mask images of the building in two captured images.

In this manner, the difference detection device executes segmentation processing on two captured images to generate a mask image for each captured image. The difference detection device detects difference (change region) between images based on difference between the mask images in the two captured images.

CITATION LIST

Non-Patent Literature

Non-Patent Literature 1: Tashiro and six others, "Improvement of the accuracy of detecting change between aerial captured images by removing plant and road regions", IEICE General Conference, D-11-37, 2018.

SUMMARY OF THE INVENTION

Technical Problem

However, a conventional difference detection device inputs only captured images to a neural network and does not use, in difference detection processing, information other than an image characteristic output from the neural network. In other words, it is unknown which characteristic is to be extracted by learning for each group of images used as learning data. Thus, the conventional difference detection device cannot improve the accuracy of detecting difference between images.

The present invention is intended to solve the above-described problem and provide a difference detection device and a difference detection program that can improve the accuracy of detecting difference between images.

Means for Solving the Problem

A difference detection device according to an aspect of the present invention includes a difference detection unit configured to, based on association among a first image and a second image captured at different times and illustrating a substantially identical space and encoding information of each of the first image and the second image, detect difference between a third image and a fourth image captured at different times and illustrating a substantially identical space, and the encoding information is information acquired from data including the first image encoded and data including the second image encoded, before inverse transform processing is executed in decoding processing executed on each of the first image and the second image.

In the above-described difference detection device according to another aspect of the present invention, the third image and the fourth image are blocks that divide a frame related to an image, and the difference detection unit detects the difference between the third image and the fourth image for each block of the frame.

In the above-described difference detection device according to another aspect of the present invention, the association is association of output values from neural networks at a previous stage, which have executed learning based on any of the first image, the second image, and the encoding information.

The above-described difference detection device according to another aspect of the present invention further includes a neural network at a later stage, which has executed learning so that each output value approaches a first value when it is determined that the first image and the second image have difference and the output value approaches a second value when it is determined that the first image and the second image have no difference.

In the above-described difference detection device according to another aspect of the present invention, the encoding information is information of any of an encoding amount, an intra prediction mode, a transform coefficient, and an image characteristic.

The above-described difference detection device according to another aspect of the present invention further includes a transform unit configured to transform the encoding information into an image format, and the difference detection unit detects the difference between the third image and the fourth image based on the encoding information transformed into the image format.

A difference detection device according to another aspect of the present invention includes a difference detection unit configured to, based on association among a first image and a second image captured at different times and illustrating a substantially identical space and encoding information of each of the first image and the second image, detect difference between a third image and a fourth image captured at different times and illustrating a substantially identical space, and the encoding information is information acquired from data including the first image being encoded and data including the second image being encoded, after transform processing is executed in encoding processing executed on the first image and the second image.

A difference detection program according to another aspect of the present invention causes a computer to function as the above-described difference detection device.

Effects of the Invention

According to the present invention, it is possible to improve the accuracy of detecting difference between images.

DESCRIPTION OF EMBODIMENTS

Embodiments of the present invention will be described below in detail with reference to the accompanying drawings.

First Embodiment

Figure 1:
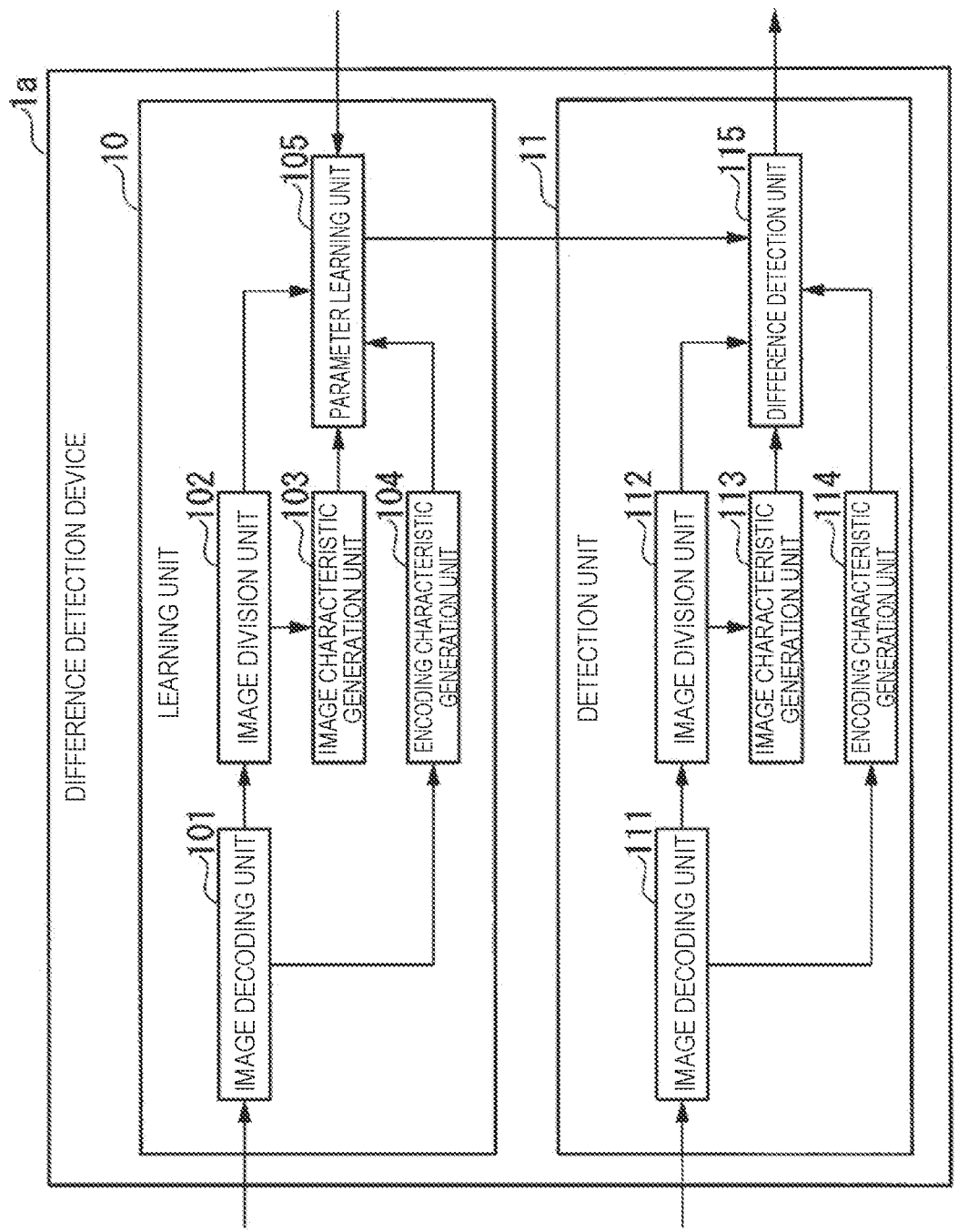
FIG. 1 is a diagram illustrating an exemplary configuration of a difference detection device in a first embodiment.

FIG. 1 is a diagram illustrating an exemplary configuration of a difference detection device 1a. The difference detection device 1a is an information processing device configured to detect difference between images. Each image is, for example, an image illustrating the ground and captured from the overhead space by an artificial satellite or the like. The difference between images is, for example, the difference (change region) between images captured at different times and illustrating a substantially identical space.

The difference detection device 1a includes a learning unit 10 and a detection unit 11. The difference detection device 1a may further include a storage unit. Part or all of the learning unit 10 and the detection unit 11 is achieved by a processor such as a central processing unit (CPU) executing a computer program stored in the storage unit. Part or all of functional components of the learning unit 10 and the detection unit 11 may be achieved, for example, by using hardware such as a large-scale integration (LSI) or an application specific integrated circuit (ASIC).

The storage unit is preferably, for example, a non-volatile recording medium (non-temporary recording medium) such as a flash memory or a hard disk drive (HDD). The storage unit may include a volatile recording medium such as a random-access memory (RAM). The storage unit stores, for example, data of a model of machine learning such as deep learning and computer programs.

The learning unit 10 learns parameters of a model by machine learning such as deep learning. The learning unit 10 includes an image decoding unit 101, an image division unit 102, an image characteristic generation unit 103, an encoding characteristic generation unit 104, and a parameter learning unit 105.

The image decoding unit 101 acquires a plurality of learning target image streams. Each image stream is a moving image stream. The image decoding unit 101 decodes a group of image frames from the image stream. The image decoding unit 101 outputs the group of image frames to the image division unit 102.

The image stream is data including a group of encoded images and is, for example, a stream of a group of images obtained by capturing an identical space at different times. The image stream is, for example, a stream of images encoded by using an algorithm of H.265/HEVC (High Efficiency Video Coding), JPEG (Joint Photographic Experts Group), or the like. Hereinafter, as an example, the image stream is a stream of images encoded by using the H.265/HEVC algorithm.

The image decoding unit 101 acquires one or more pieces of encoding information (encoding information set) from each learning target image stream. For example, the image decoding unit 101 acquires one or more pieces of encoding information from the header of the learning target image stream. The image decoding unit 101 outputs the one or more pieces of encoding information of each learning target image stream to the encoding characteristic generation unit 104.

The encoding information is information related to image stream encoding and is, for example, information of the encoding amount of each image, information of the encoding mode (for example, an intra prediction mode) of each image frame, information of transform coefficients, information of the number of significant coefficients among the transform coefficients, or information of characteristic information (for example, spatial frequency) related to the image.

The encoding amount of a region that is a vacant site in a past image captured from the overhead space potentially increases in a future image as compared to the past image in accordance with edges and texture of a building or the like existing in the region in the future image. Thus, when a difference detection unit 115 detects an image (change region) of a new building, the encoding information is, for example, information of the encoding amount.

An image of a solar panel is expressed by a particular design pattern (repetition of design of the solar panel). An image of grass on the ground is often not expressed by a particular design pattern. Thus, when the difference detection unit 115 detects an image (change region) of grass on a solar panel installed on the ground, the encoding information is information of an encoding mode such as the intra prediction mode. These are merely exemplary. The encoding information may be combination of a plurality of kinds of information. For example, the encoding information may be combination of information of the encoding amount and information of the encoding mode. The encoding information may include information (hereinafter referred to as "image characteristic information") indicating a characteristic of an image.

The image division unit 102 acquires a group of image frames from the image decoding unit 101. The image division unit 102 generates a group of image blocks by dividing each image frame into N×N image blocks. The value N is an integer (the number of pixels) equal to or larger than two and is, for example, 256.

The image division unit 102 divides each image frame into image blocks so that the image blocks do not overlap each other. The image division unit 102 outputs the group of image blocks to the image characteristic generation unit 103 and the parameter learning unit 105.

The group of image blocks includes information of the time of image capturing and information of the position of image capturing on the ground or the like. Accordingly, the plurality of image streams are associated with each other based on the time information and the position information.

The image characteristic generation unit 103 acquires the group of image blocks from the image division unit 102. The image characteristic generation unit 103 generates the image characteristic information for each image block. Characteristics of an image are, for example, a frequency as a result of discrete cosine transform (transform processing) of each pixel value (electric power value) of each image block, and a characteristic vector such as a local binary pattern (LBP) of each image block. The image characteristic generation unit 103 outputs the image characteristic information of each image block to the parameter learning unit 105.

The image characteristic information includes information of the time of image capturing and information of the position of image capturing on the ground or the like. The pieces of image characteristic information of the respective image streams are associated with each other based on the time information and the position information.

The encoding characteristic generation unit 104 acquires one or more pieces of the encoding information from the image decoding unit 101.
Hereinafter, information indicating characteristics of one or more pieces of the encoding information is referred to as "encoding characteristic information".
The encoding characteristic generation unit 104 generates (collects) the encoding characteristic information for each image block.
For example, when the encoding characteristic information is generated in units of 128×128 for N×N (=256×256) image blocks, the encoding characteristic information of each image block is a characteristic vector (four-dimensional characteristic vector) including four pieces of the encoding information (for example, information of the encoding amount). The encoding characteristic information of each image block may be information (one-dimensional characteristic vector) of the average value of four encoding amounts. The encoding characteristic generation unit 104 outputs the encoding characteristic information of each image block to the parameter learning unit 105.

The parameter learning unit 105 acquires each of image blocks captured at different times and illustrating an identical space in the plurality of learning target image streams, and the image characteristic information and the encoding characteristic information of the image block.

For each of image blocks captured at different times and illustrating an identical space, the parameter learning unit 105 acquires label data indicating whether the image block is a change region (difference) from an external device or the like. For example, the label data of "1" indicates that the image block is a change region. The label data of "0" indicates that the image block is not a change region. The parameter learning unit 105 inputs each image block and the image characteristic information and the encoding characteristic information of the image block into a machine learning model.

Figure 2:
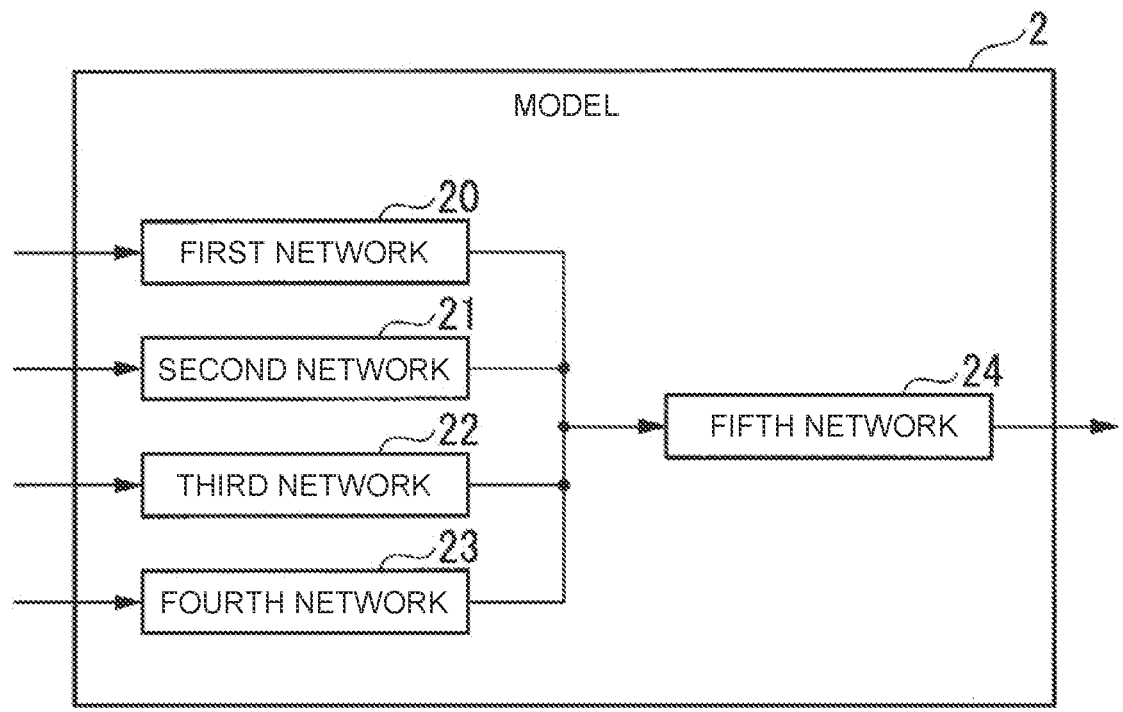
FIG. 2 is a diagram illustrating an exemplary configuration of a model of machine learning such as deep learning in the first embodiment.

FIG. 2 is a diagram illustrating an exemplary configuration of a model 2 of machine learning such as deep learning. The model 2 is a model of machine learning such as a deep neural network and is, for example, a convolutional neural network (CNN) in FIG. 2. The model 2 is used for change region estimation. The model 2 is stored in, for example, the storage unit of the difference detection device 1a. The storage unit is included in, for example, the parameter learning unit 105.

The model 2 includes a first network 20, a second network 21, a third network 22, a fourth network 23, and a fifth network 24. The first network 20 has superposition of a convolution layer and a pooling layer. The parameter learning unit 105 inputs an image block captured at Time "A" and illustrating a space to the first network 20. The first network 20 repeatedly executes learning using the convolution layer and the pooling layer for the image block captured at Time "A".

The second network 21 has superposition of a convolution layer and a pooling layer. The parameter learning unit 105 inputs an image block captured at Time "B" and illustrating the identical space to the second network 21. The second network 21 repeatedly executes learning (for example, convolution calculation) using the convolution layer and the pooling layer for the image block captured at Time "B" and illustrating the identical space.

The third network 22 has superposition of a convolution layer and a pooling layer. The parameter learning unit 105 inputs, to the third network 22, the image characteristic information of an image block captured at Time "A" and illustrating a space and the image characteristic information of an image block captured at Time "B" and illustrating the identical space. The third network 22 repeatedly executes learning using the convolution layer and the pooling layer for the image characteristic information of the image block captured at Time "A" and illustrating a space and the image characteristic information of the image block captured at Time "B" and illustrating the identical space.

The fourth network 23 has superposition of a convolution layer and a pooling layer. The parameter learning unit 105 inputs, to the fourth network 23, the encoding characteristic information of an image block captured at Time "A" and illustrating a space and the encoding characteristic information of an image block captured at Time "B" and illustrating the identical space. The fourth network 23 repeatedly executes learning using the convolution layer and the pooling layer for the encoding characteristic information of the image block captured at Time "A" and illustrating a space and the encoding characteristic information of the image block captured at Time "B" and illustrating the identical space.

In this manner, the parameter learning unit 105 associates an output from the first network 20, an output from the second network 21, an output from the third network 22, and an output from the fourth network 23. In other words, difference in the image characteristic and difference in the encoding information in accordance with the existence of difference between Times A and B are associated with each other.

The fifth network 24 (neural network at a later stage) is a connected layer (fully connected layer) of the outputs from the first network 20, the second network 21, the third network 22, and the fourth network 23. The fifth network 24 causes the parameter learning unit 105 to acquire an estimation value of 0 to 1 based on the outputs from the first network 20, the second network 21, the third network 22, and the fourth network 23 at the previous stage. The estimation value of "1" (first value) indicates that the image block is a change region. The estimation value of "0" (second value) indicates that the image block is not a change region. These correspondence relations are exemplary.

The parameter learning unit 105 acquires the estimation value output from the machine learning model 2. The parameter learning unit 105 derives the error between the label data indicating whether the image block is a change region and the estimation value. The parameter learning unit 105 learns (updates) parameters of the machine learning model 2 based on a result of comparison (estimated error) between the estimation value and the label data. The parameter learning unit 105 updates the parameters of the model 2 based on the derived error. For example, the parameter learning unit 105 updates the parameters by error back propagation or the like. The parameter learning unit 105 outputs the model 2, the parameters of which are learned to the detection unit 11.

The parameter learning unit 105 may determine, for each image block, whether the image block is a change region (difference) based on a result of comparison of the estimation value as an output from the model 2 with a threshold value. When the estimation value is equal to or larger than the threshold value, the parameter learning unit 105 determines that the image block is a change region. When the estimation value is smaller than the threshold value, the parameter learning unit 105 determines that the image block is not a change region. The parameter learning unit 105 may update the parameters of the machine learning model 2 based on the error between the determination result indicating whether the image block is a change region and the label data by using the determination result instead of using the estimation value. In other words, the parameter learning unit 105 may update the parameters of the machine learning model 2 when the determination result indicating whether the image block is a change region and the label data are different from each other.

The parameter learning unit 105 can decrease the dependency of learning of the parameters of the model 2 on the image characteristic information (an image property) by updating the parameters of the model 2 based on the encoding characteristic information input to the model 2. For example, in a case in which the model 2 having parameters learned by using a group of image blocks having first image characteristic information receives inputting of a group of image blocks having second image characteristic information and outputs the estimation value for each image block, the parameter learning unit 105 can decrease the dependency of learning of the parameters of the model 2 on the first image characteristic information when an encoding information characteristic input to the model 2 holds the second image characteristic information (an image property). Accordingly, the difference detection device 1a can improve the accuracy of detecting the difference between an image having the first image characteristic information and an image having the second image characteristic information.

Description of the exemplary configuration of the difference detection device 1a continues with reference to FIG. 1. The detection unit 11 detects, by using a learned model, the difference (change region) between images captured at different times and illustrating an identical space. The detection unit 11 includes an image decoding unit 111, an image division unit 112, an image characteristic generation unit 113, an encoding characteristic generation unit 114, and the difference detection unit 115.

The configuration of the image decoding unit 111 is same as the configuration of the image decoding unit 101. The image decoding unit 111 acquires a plurality of detection target image streams (data including encoded images). The plurality of image streams are a stream of images captured in a first time slot and illustrating a space, and a stream of images captured in a second time slot and illustrating the identical space. The image decoding unit 111 decodes a group of image frames from each image stream. The image decoding unit 111 outputs the group of image frames to the image division unit 112.

The configuration of the image division unit 112 is same as the configuration of the image division unit 102. The image division unit 112 acquires the group of image frames from the image decoding unit 111. The image division unit 112 generates a group of image blocks by dividing each image frame into N×N image blocks. The image division unit 112 outputs the group of image blocks to the image characteristic generation unit 113 and the difference detection unit 115.

The configuration of the image characteristic generation unit 113 is same as the configuration of the image characteristic generation unit 103. The image characteristic generation unit 113 acquires the group of image blocks from the image division unit 112. The image characteristic generation unit 113 generates the image characteristic information for each image block. The image characteristic generation unit 113 outputs the image characteristic information of each image block to the difference detection unit 115.

The configuration of the encoding characteristic generation unit 114 is same as the configuration of the encoding characteristic generation unit 104. The encoding characteristic generation unit 114 acquires one or more pieces of the encoding information from the image decoding unit 111. The encoding characteristic generation unit 114 generates (collects) the encoding characteristic information for each image block. The encoding characteristic generation unit 114 outputs the encoding characteristic information of each image block to the difference detection unit 115.

The difference detection unit 115 acquires a learned model from the parameter learning unit 105. The difference detection unit 115 acquires each of image blocks captured at different times and illustrating an identical space in the plurality of detection target image streams, and the image characteristic information and the encoding characteristic information of the image block.

The difference detection unit 115 inputs each image block and the image characteristic information and the encoding characteristic information of the image block to the machine learning model 2. The difference detection unit 115 acquires the estimation value (output value) output from the machine learning model 2. The difference detection unit 115 determines whether the image block is a change region based on the estimation value output from the machine learning model 2 and a threshold value. The difference detection unit 115 outputs a determination result indicating whether the image block is a change region between images to a predetermined external device.

The following describes exemplary operation of the difference detection device 1a.

Figure 3:
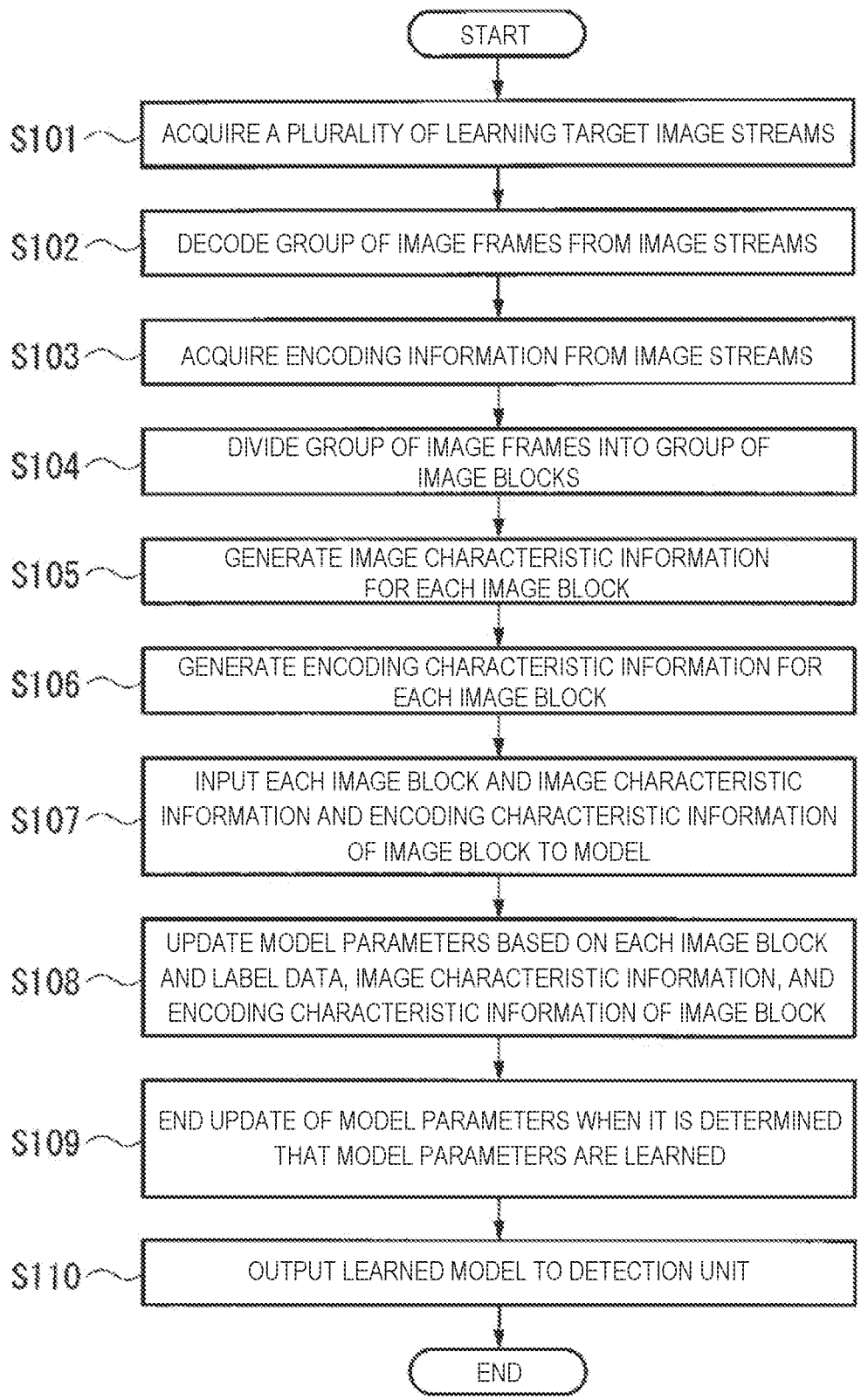
FIG. 3 is a flowchart illustrating exemplary operation of a learning unit in the first embodiment.

FIG. 3 is a flowchart illustrating exemplary operation of the learning unit 10. The flowchart illustrated in FIG. 3 indicates exemplary operation in which the learning unit 10 outputs the learned model 2 to the detection unit 11.

The image decoding unit 101 acquires a plurality of learning target image streams (step S101). The image decoding unit 101 decodes a group of image frames from the image streams and outputs the group of image frames to the image division unit 102 (step S102). The image decoding unit 101 acquires the encoding information from the image streams and outputs the encoding information of each learning target image stream to the encoding characteristic generation unit 104 (step S103). The image division unit 102 divides each image frame into N×N image blocks (step S104). The image characteristic generation unit 103 generates the image characteristic information for each image block (step S105).

The encoding characteristic generation unit 104 generates the encoding characteristic information for each of the N×N image blocks (step S106). The parameter learning unit 105 inputs each image block and the image characteristic information and the encoding characteristic information of the image block to the model 2 (step S107). The parameter learning unit 105 updates the parameters of the model 2 based on each image block and the label data, the image characteristic information, and the encoding characteristic information of the image block (step S108).

The parameter learning unit 105 determines whether the parameters of the model 2 are learned (satisfy conditions for learning completion). For example, when the model 2 has learned the parameters by using a predetermined number of images or more, the parameter learning unit 105 determines that the parameters of the model 2 are learned when the number of occurrences that the error (estimated error) between the estimation value as an output from the model 2 and the label data is in a predetermined range has become equal to or larger than a certain number. When having determined that the parameters of the model 2 are learned, the parameter learning unit 105 ends update of the parameters of the model 2 (step S109). The parameter learning unit 105 outputs the learned model 2 to the difference detection unit 115 (step S110).

Figure 4:
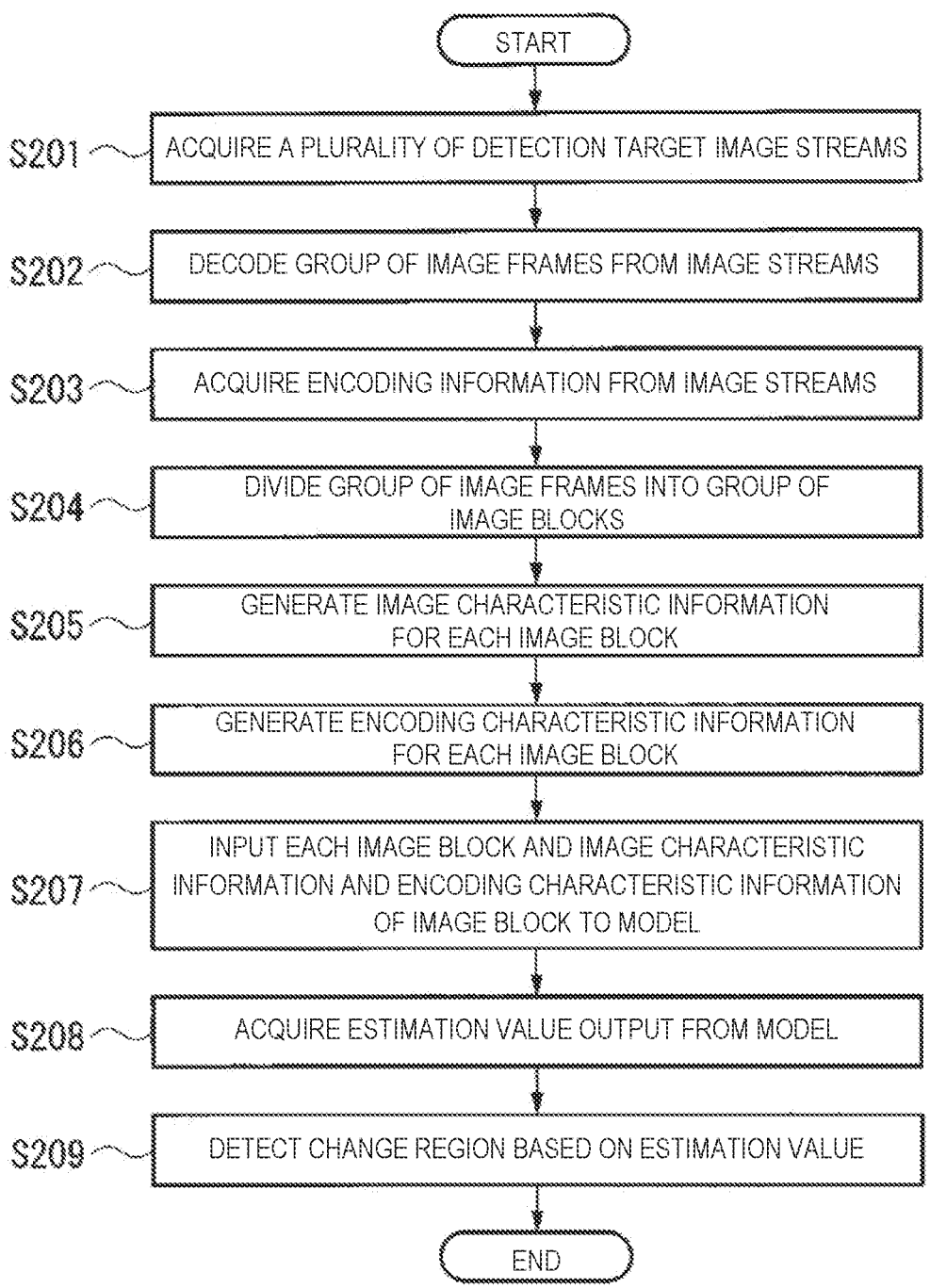
FIG. 4 is a flowchart illustrating exemplary operation of a detection unit in the first embodiment.

FIG. 4 is a flowchart illustrating exemplary operation of the detection unit 11. The flowchart illustrated in FIG. 4 illustrates exemplary operation in which the estimation value is output to the detection unit 11.

The image decoding unit 111 acquires a plurality of detection target image streams (step S201). The image decoding unit 111 decodes a group of image frames from the image streams and outputs the group of image frames to the image division unit 112 (step S202). The image decoding unit 111 acquires the encoding information from the image streams and outputs the encoding information of each learning target image stream to the encoding characteristic generation unit 114 (step S203). The image division unit 112 divides each image frame into N×N image blocks (step S204). The image characteristic generation unit 113 generates the image characteristic information for each image block (step S205).

The encoding characteristic generation unit 114 generates the encoding characteristic information for each of N×N image blocks (step S206). The difference detection unit 115 inputs each image block and the image characteristic information and the encoding characteristic information of the image block to the model 2 (step S207).

The difference detection unit 115 acquires the estimation value (output value) of 0 to 1 from the model (step S208). The difference detection unit 115 detects a change region based on the estimation value. Specifically, the difference detection unit 115 determines whether each image block is a change region (difference) based on a result of comparison of the estimation value as an output from the model 2 with a threshold value.

For example, when the estimation value is equal to or larger than the threshold value of "0.5", the difference detection unit 115 determines that the image block is a change region. When the estimation value is smaller than the threshold value of "0.5", the difference detection unit 115 determines that the image block is not a change region (step S209).

The following describes the exemplary operation of the learning unit 10 in detail.

Figure 5:
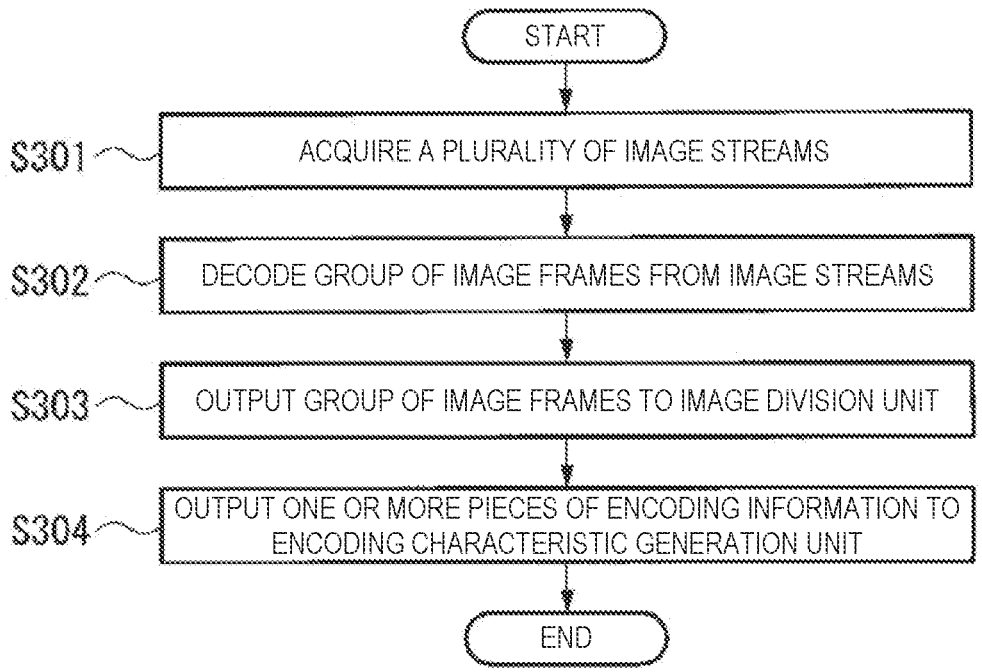
FIG. 5 is a flowchart illustrating exemplary operation of an image decoding unit in the first embodiment.

FIG. 5 is a flowchart illustrating exemplary operation of the image decoding unit 101. The image decoding unit 101 acquires a plurality of learning target image streams (step S301). The image decoding unit 101 decodes a group of image frames from the image streams (step S302). The image decoding unit 101 outputs the group of image frames to the image division unit 102 (step S303). The image decoding unit 101 outputs one or more pieces of the encoding information of each learning target image stream to the encoding characteristic generation unit 104 (step S304).

Figure 6:
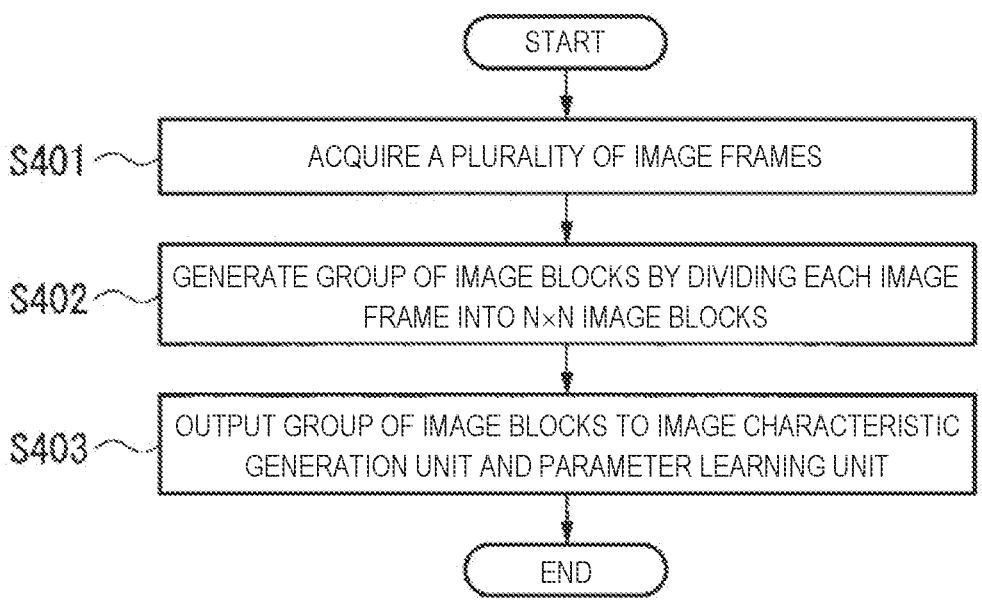
FIG. 6 is a flowchart illustrating exemplary operation of an image division unit in the first embodiment.

FIG. 6 is a flowchart illustrating exemplary operation of the image division unit 102. The image division unit 102 acquires the group of image frames from the image decoding unit 101 (step S401). The image division unit 102 generates a group of image blocks by dividing each image frame into N×N image blocks (step S402). The image division unit 102 outputs the group of image blocks to the image characteristic generation unit 103 and the parameter learning unit 105 (step S403).

Figure 7:
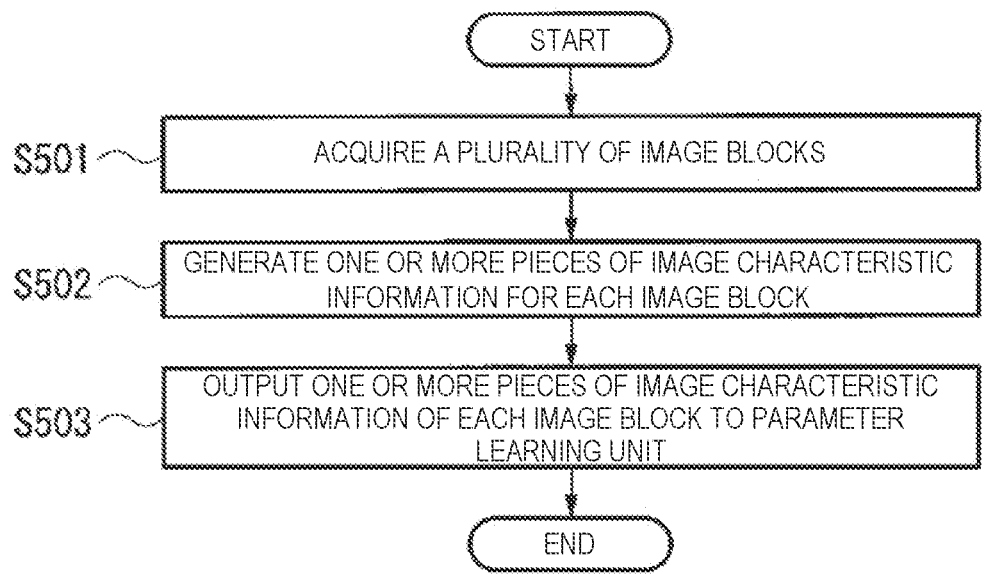
FIG. 7 is a flowchart illustrating exemplary operation of an image characteristic generation unit in the first embodiment.

FIG. 7 is a flowchart illustrating exemplary operation of the image characteristic generation unit 103. The image characteristic generation unit 103 acquires the group of image blocks from the image division unit 102 (step S501). The image characteristic generation unit 103 generates one or more pieces of the image characteristic information for each image block. For example, the image characteristic generation unit 103 generates four pieces of the image characteristic information having a size of 128×128 for each of 256×256 image blocks (step S502). The image characteristic generation unit 103 outputs the one or more pieces of the image characteristic information of each image block to the parameter learning unit 105 (step S503).

Figure 8:
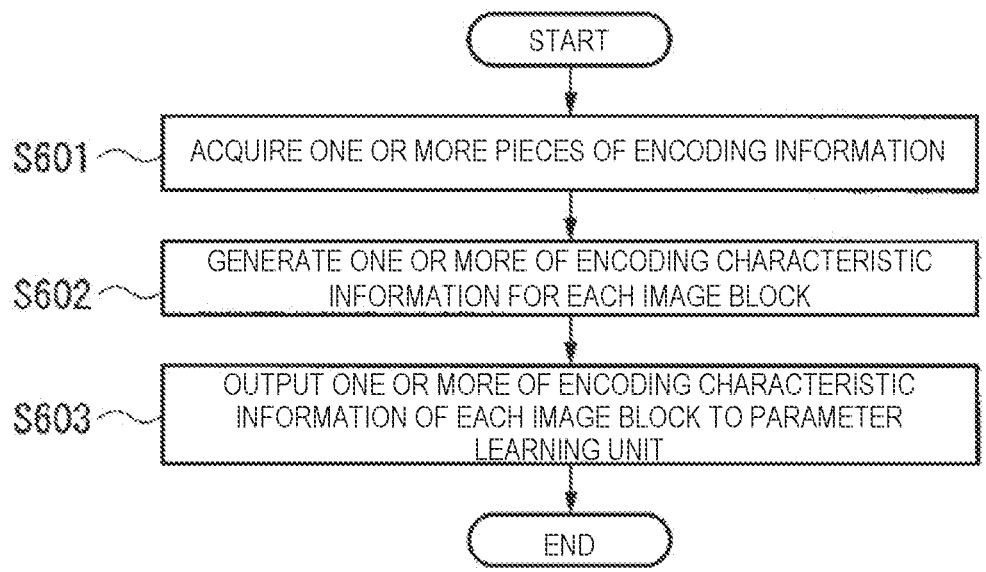
FIG. 8 is a flowchart illustrating exemplary operation of an encoding characteristic generation unit in the first embodiment.

FIG. 8 is a flowchart illustrating exemplary operation of the encoding characteristic generation unit 104. The encoding characteristic generation unit 104 acquires the one or more pieces of the encoding information from the image decoding unit 101 (step S601). The encoding characteristic generation unit 104 generates one or more of the encoding characteristic information for each image block. For example, the encoding characteristic generation unit 104 generates four pieces of the encoding characteristic information having a size of 128×128 for each of 256×256 image blocks (step S602). The encoding characteristic generation unit 104 outputs the one or more of the encoding characteristic information of each image block to the parameter learning unit 105 (step S603).

Figure 9:
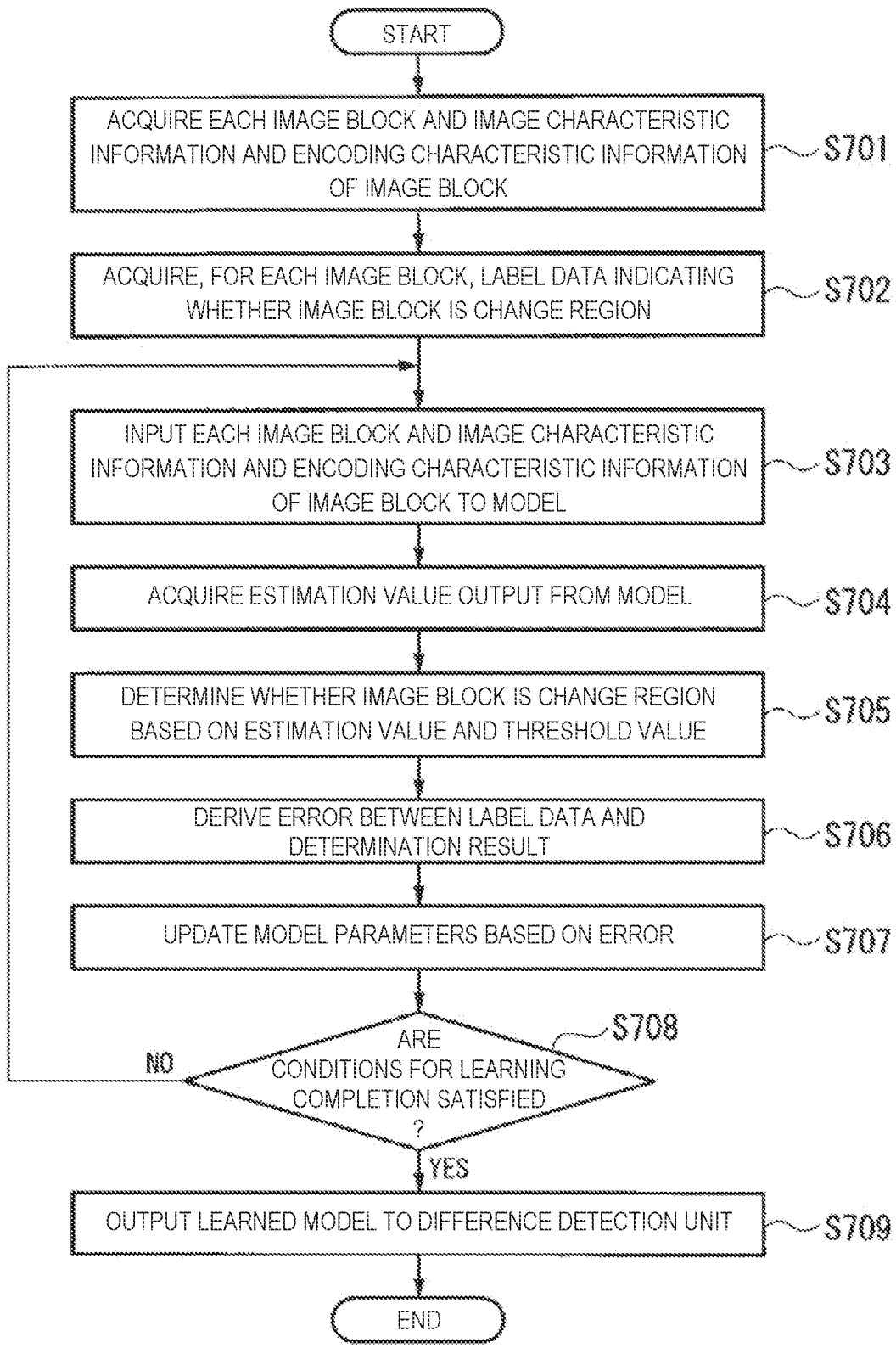
FIG. 9 is a flowchart illustrating exemplary operation of a parameter learning unit in the first embodiment.

FIG. 9 is a flowchart illustrating exemplary operation of the parameter learning unit 105. The parameter learning unit 105 acquires each of image blocks captured at different times and illustrating an identical space in the plurality of learning target image streams, and the image characteristic information and the encoding characteristic information of the image block (step S701). The parameter learning unit 105 acquires, for each of the image blocks captured at different times and illustrating an identical space, the label data indicating whether the image block is a change region (difference) from an external device or the like (step S702).

The parameter learning unit 105 inputs each image block and the image characteristic information and the encoding characteristic information of the image block to the machine learning model 2 (step S703). The parameter learning unit 105 acquires the estimation value output from the machine learning model 2 (step S704). The parameter learning unit 105 determines whether the image block is a change region based on the estimation value and a threshold value (step S705). The parameter learning unit 105 derives the error between the label data and a result of the determination or the estimation value (step S706). The parameter learning unit 105 updates the parameters of the model 2 based on the derived error (step S707).

The parameter learning unit 105 determines whether the parameters of the model 2 are learned (satisfy conditions for learning completion) (step S708). When the parameters of the model 2 are not learned (NO at step S708), the parameter learning unit 105 returns the processing to step S703. When the parameters of the model 2 are learned (YES at step S708), the parameter learning unit 105 outputs the learned model 2 to the difference detection unit 115 (step S709).

The following describes the exemplary operation of the detection unit 11 in detail.

Figure 10:
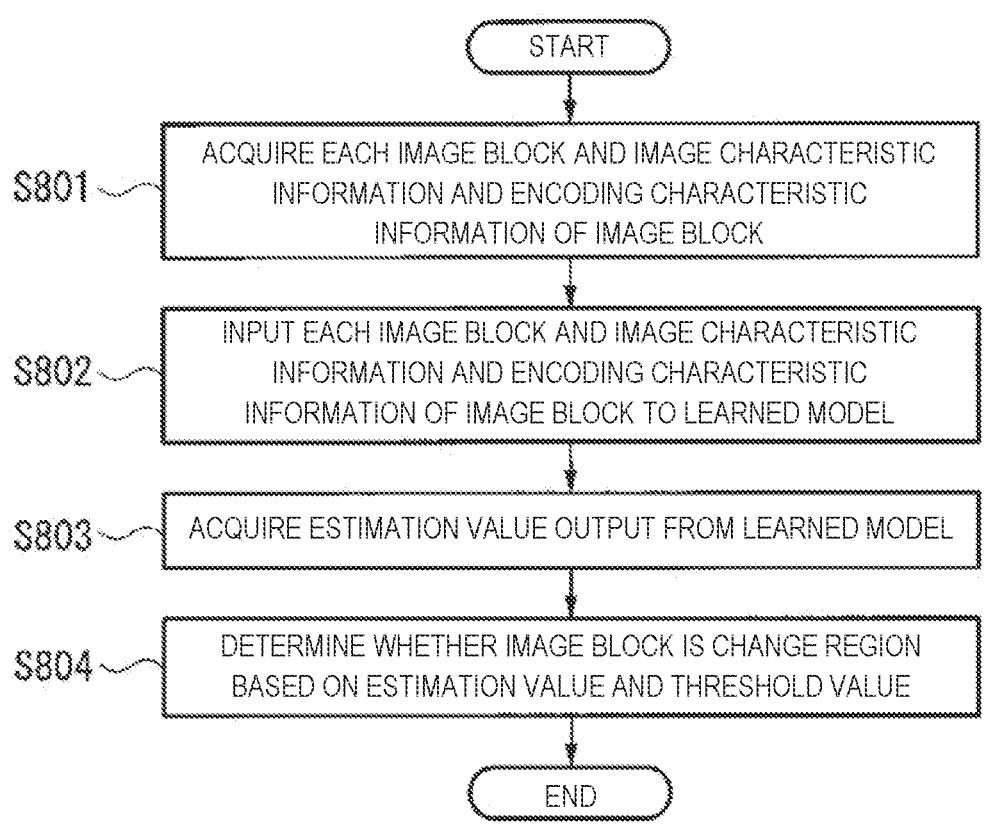
FIG. 10 is a flowchart illustrating exemplary operation of a difference detection unit in the first embodiment.

FIG. 10 is a flowchart illustrating exemplary operation of the difference detection unit 115. The difference detection unit 115 acquires each of image blocks captured at different times and illustrating an identical space in a plurality of detection target image streams, and the image characteristic information and the encoding characteristic information of the image block (step S801).

The difference detection unit 115 inputs each image block and the image characteristic information and the encoding characteristic information of the image block to the learned model 2 (step S802). The difference detection unit 115 acquires the estimation value (output value) output from the learned model 2 (step S803). The difference detection unit 115 determines whether the image block is a change region based on the estimation value output from the learned model 2 and a threshold value (step S804).

As described above, the difference detection device 1a of the first embodiment includes the difference detection unit 115. Based on association among a first image block and a second image block (learning target image blocks) captured at different times and illustrating a substantially identical space and the encoding information of each of the first image block and the second image block, the difference detection unit 115 detects the difference between a third image block and a fourth image block (detection target image blocks) captured at different times and illustrating a substantially identical space. The encoding information is information acquired from data (first image stream) including the first image block encoded and data (second image stream) including the second image block encoded, before inverse transform processing (such as reverse discrete cosine transform) is executed in decoding processing executed on each of the first image block and the second image block. The decoding processing executes, for example, processing of acquiring the encoding information such as header information from an image stream, inverse quantization processing, and the inverse transform processing in the stated order. The encoding information may include the image characteristic information. The encoding information may be information acquired from data (first image stream) including the first image block being encoded and data (second image stream) including the second image block being encoded, after transform processing (such as discrete cosine transform) is executed in encoding processing executed on each of the first image block and the second image block. The encoding processing executes, for example, the transform processing and processing of acquiring the encoding information such as header information in the stated order. In this manner, the encoding information used for difference detection may be acquired while the encoding processing is executed (during encoding).

Accordingly, the difference detection device 1a of the first embodiment can improve the accuracy of detecting difference between images.

In the embodiment, processing executed on an encoded image is, for example, a kind of processing (function) of extracting the image characteristic information (image characteristic amount). The encoding characteristic information may include the image characteristic information. Thus, the difference detection device 1a not only uses image data as learning data but also uses the encoding information as learning data. The difference detection device 1a reliably uses the encoding information as learning data so that the encoding characteristic information, which is potentially lost in machine learning, is not lost in machine learning.

A conventional threshold value used to determine whether difference between mask images is a change region needs to be adjusted in advance. The conventional threshold value is potentially different for each captured image. Thus, the conventional threshold value needs high adjustment cost. However, a threshold value used by the difference detection device 1a is predetermined to be a constant value (for example, 0.5). Thus, the threshold value used by the difference detection device 1a needs no adjustment cost.

The third image block and the fourth image block are image blocks generated by dividing an image frame (frame related to an image). The difference detection unit 115 detects the difference between the third image block and the fourth image block for each image block of the image frame. The association is association of output values from the first network 20 to the fourth network 23, which have executed learning based on the first image block, the second image block, and the encoding information.

The difference detection device 1a of the first embodiment further includes the fifth network 24. The fifth network 24 is a neural network at a later stage, which has executed learning so that each output value approaches the first value (for example, 1) when it is determined that the first image block and the second image block have difference and the output value approaches the second value (for example, 0) when it is determined that the first image and the second image have no difference.

Second Embodiment

A second embodiment is different from the first embodiment in that the encoding characteristic information is imaged. The second embodiment describes the difference from the first embodiment.

Figure 11:
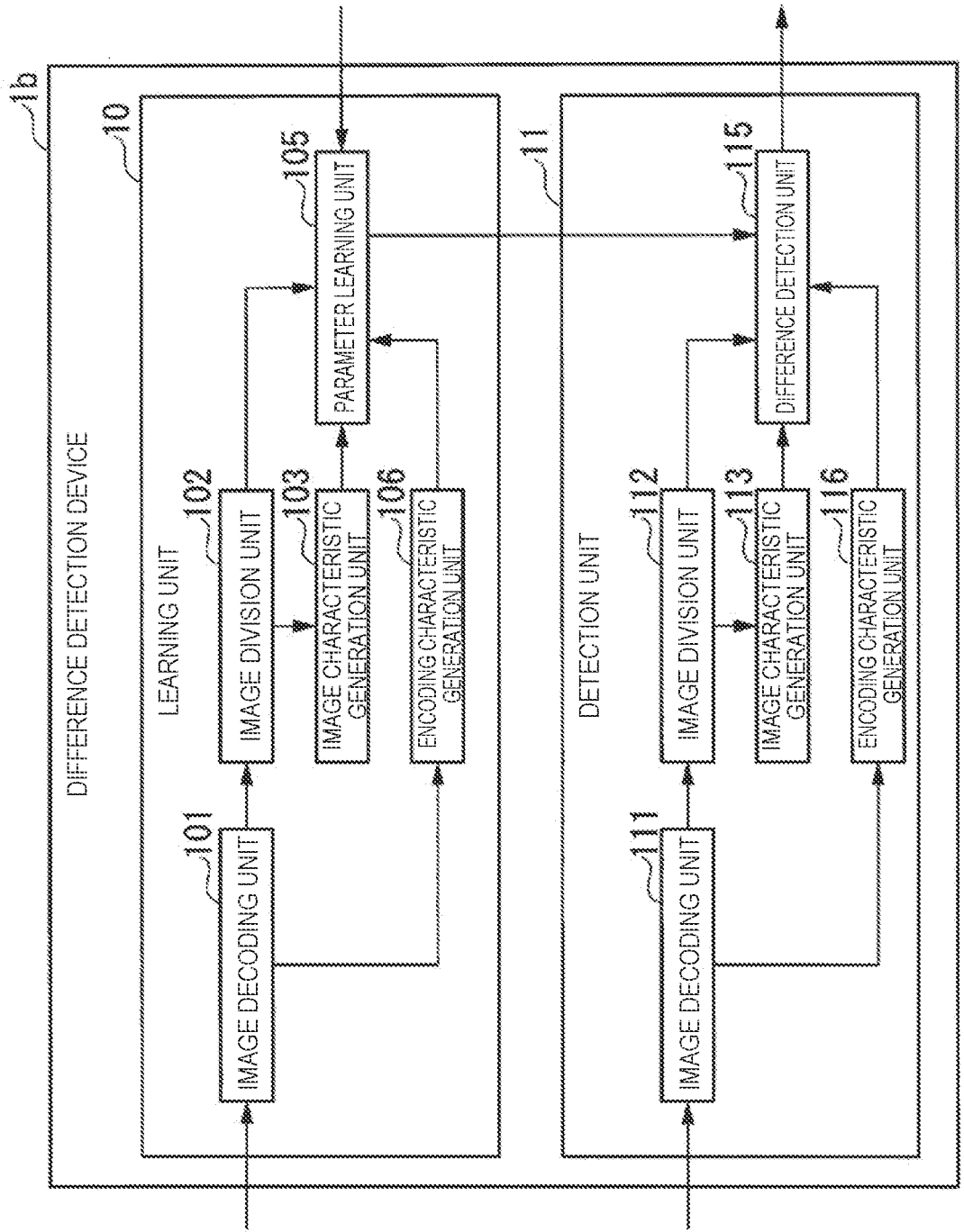
FIG. 11 is a diagram illustrating an exemplary configuration of a difference detection device in a second embodiment.

FIG. 11 is a diagram illustrating an exemplary configuration of a difference detection device 1b. The difference detection device 1b is an information processing device configured to detect difference between images. The difference detection device 1b includes the learning unit 10 and the detection unit 11. The difference detection device 1b may further include the storage unit. The learning unit 10 includes the image decoding unit 101, the image division unit 102, the image characteristic generation unit 103, the parameter learning unit 105, and an encoding characteristic imaging unit 106. The encoding characteristic imaging unit 106 includes the encoding characteristic generation unit 104 and a transform unit configured to transform the encoding information or the encoding characteristic information into an image format.

The encoding characteristic imaging unit 106 acquires one or more pieces of the encoding information for each of N×N image blocks from the image decoding unit 101. The encoding characteristic imaging unit 106 generates (collects) the encoding characteristic information for each of the N×N image blocks. The encoding characteristic imaging unit 106 images the encoding characteristic information (transforms the encoding characteristic information into an image format). For example, when the encoding characteristic information is generated in units of 128×128 for the N×N (=256×256) image blocks, the encoding characteristic imaging unit 106 images the encoding characteristic information in units of 128×128. In other words, the encoding characteristic imaging unit 106 generates images having a size of 128×128 based on the encoding characteristic information. In this case, the encoding characteristic imaging unit 106 generates four images having a size of 128×128 for each of the N×N image blocks based on four pieces of the encoding characteristic information. The encoding characteristic imaging unit 106 outputs the imaged encoding characteristic information (hereinafter referred to as "encoding characteristic image") of each image block to the parameter learning unit 105.

The parameter learning unit 105 acquires each of image blocks captured at different times and illustrating an identical space in a plurality of learning target image streams, and the image characteristic information and the encoding characteristic image of the image block. The parameter learning unit 105 inputs each image block and the image characteristic information and the encoding characteristic image of the image block to the machine learning model 2. For example, the parameter learning unit 105 inputs, to the fourth network 23, the encoding characteristic image of an image block captured at Time "A" and illustrating a space and the encoding characteristic image of an image block captured at Time "B" and illustrating the identical space.

The detection unit 11 includes the image decoding unit 111, the image division unit 112, the image characteristic generation unit 113, the difference detection unit 115, and an encoding characteristic imaging unit 116. The encoding characteristic imaging unit 116 includes the encoding characteristic generation unit 114 and a transform unit configured to transform the encoding information or the encoding characteristic information into an image format.

The encoding characteristic imaging unit 116 acquires one or more pieces of the encoding information for each of N×N image blocks from the image decoding unit 111. The encoding characteristic imaging unit 116 generates (collects) the encoding characteristic information for each of N×N image blocks. The encoding characteristic imaging unit 116 images the encoding characteristic information. The encoding characteristic imaging unit 116 outputs the encoding characteristic image of each image block to the difference detection unit 115.

The difference detection unit 115 acquires each of image blocks captured at different times and illustrating an identical space in a plurality of detection target image streams, and the image characteristic information and the encoding characteristic image of the image block. The difference detection unit 115 inputs each image block and the image characteristic information and the encoding characteristic image of the image block to the machine learning model 2. For example, the difference detection unit 115 inputs, to the fourth network 23, the encoding characteristic image of an image block captured at Time "A" and illustrating a space and the encoding characteristic image of an image block captured at Time "B" and illustrating the identical space.

The following describes exemplary operation of the learning unit 10 and the detection unit 11 in detail.

Figure 12:
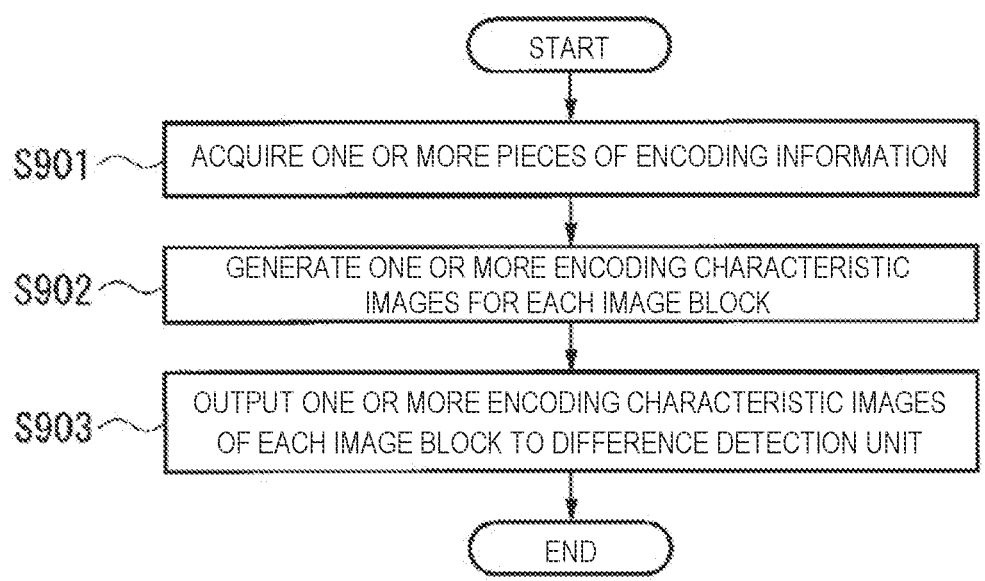
FIG. 12 is a flowchart illustrating exemplary operation of an encoding characteristic imaging unit in the second embodiment.

FIG. 12 is a flowchart illustrating exemplary operation of the encoding characteristic imaging unit 106. The encoding characteristic imaging unit 106 acquires one or more pieces of the encoding information from the image decoding unit 101 (step S901). The encoding characteristic imaging unit 106 generates one or more encoding characteristic images for each image block. For example, the encoding characteristic generation unit 104 generates four encoding characteristic images having a size of 128×128 for each of 256×256 image blocks (step S902). The encoding characteristic imaging unit 106 outputs the one or more encoding characteristic images of each image block to the parameter learning unit 105 (step S903).

Exemplary operation of the encoding characteristic imaging unit 116 is same as the exemplary operation of the encoding characteristic imaging unit 106. The encoding characteristic imaging unit 116 outputs the one or more encoding characteristic images of each image block to the difference detection unit 115.

As described above, the difference detection device 1b of the second embodiment further includes a transform unit configured to transform the encoding information into an image format. The difference detection unit 115 detects the difference between a third image block and a fourth image block based on the encoding information transformed into the image format or the encoding characteristic information.

Accordingly, the difference detection device 1b of the second embodiment inputs image information generated from the encoding information to a convolutional neural network, and thus can perform difference detection with spatial correlation of the encoding information taken into account, thereby further improving the accuracy of detecting difference between images.

Although the embodiments of the present invention are described above in detail with reference to the accompanying drawings, specific configurations are not limited to the present embodiment, but designing and the like in a range not departing from the scope of the present invention are included as well.

For example, in each above-described embodiment, the difference detection device detects difference between images captured at different times and illustrating an identical space, but the difference detection device may acquire a plurality of images other than images captured at different times and illustrating an identical space. The difference detection device may detect difference among the images irrespective of the image capturing times and positions of the plurality of images. Each image may be a still image.

The difference detection device in each above-described embodiment may be achieved by a computer. In this case, the difference detection device may be achieved by recording, in a computer-readable recording medium, a computer program for achieving functions of difference detection device, loading the computer program recorded in the recording medium onto a computer system, and then executing the computer program. The "computer system" is intended to include hardware such as an OS or a peripheral instrument. The "computer-readable recording medium" is a portable medium such as a flexible disk, a magneto optical disc, a ROM, or a CD-ROM, or a storage device such as a hard disk built in the computer system. The "computer-readable recording medium" may include a medium that dynamically holds the computer program for a short time, such as a communication wire through which the computer program is transmitted through a network such as the Internet or a communication line such as a phone line, and a medium that holds the computer program for a certain time, such as a volatile memory inside the computer system as a server or a client in the transmission. The above-described computer program may achieve some of the above-described functions, may achieve the above-described functions in combination with a computer program already recorded in the computer system, and may be achieved by using a programmable logic device such as a field programmable gate array (FPGA).

INDUSTRIAL APPLICABILITY

The present invention is applicable to an image processing system.

REFERENCE SIGNS LIST 1a, 1b difference detection device
2 model
11 detection unit
20 first network
21 second network
22 third network
23 fourth network
24 fifth network
101 image decoding unit
102 image division unit
103 image characteristic generation unit
104 encoding characteristic generation unit
105 parameter learning unit
106 encoding characteristic imaging unit
111 image decoding unit
112 image division unit
113 image characteristic generation unit
114 encoding characteristic generation unit
115 difference detection unit
116 encoding characteristic imaging unit

The invention claimed is:

1. A difference detection device comprising:
a processor;
a storage medium having computer program instructions stored thereon, when executed by the processor, perform to:
based on association among a first image and a second image captured at different times and illustrating a substantially identical space and encoding information of each of the first image and the second image, detect difference between a third image and a fourth image captured at different times and illustrating a substantially identical space,
wherein the encoding information is information acquired from data including the first image encoded and data including the second image encoded, before inverse transform processing is executed in decoding processing executed on each of the first image and the second image,
wherein the association is association of output values from neural networks at a previous stage, which have executed learning based on any of the first image, the second image, and the encoding information; and
a neural network at a later stage, which has executed learning so that each output value approaches a first value when it is determined that the first image and the second image have difference and the output value approaches a second value when it is determined that the first image and the second image have no difference.

2. The difference detection device according to claim 1, wherein
the third image and the fourth image are blocks that divide a frame related to an image, and
the computer program instructions further perform to detects the difference between the third image and the fourth image for each block of the frame.

3. The difference detection device according to claim 1, wherein the encoding information is information of any of an encoding amount, an intra prediction mode, a transform coefficient, and an image characteristic.

4. The difference detection device according to claim 1, further comprising a transform unit configured to transform the encoding information into an image format,
wherein the computer program instructions further perform to detects the difference between the third image and the fourth image based on the encoding information transformed into the image format.

5. A difference detection device comprising
a processor;
a storage medium having computer program instructions stored thereon, when executed by the processor, perform to:
based on association among a first image and a second image captured at different times and illustrating a substantially identical space and encoding information of each of the first image and the second image, detect difference between a third image and a fourth image captured at different times and illustrating a substantially identical space,
wherein the encoding information is information acquired from data including the first image being encoded and data including the second image being encoded, after transform processing is executed in encoding processing executed on the first image and the second image,
wherein the association is association of output values from neural networks at a previous stage, which have executed learning based on any of the first image, the second image, and the encoding information; and
a neural network at a later stage, which has executed learning so that each output value approaches a first value when it is determined that the first image and the second image have difference and the output value approaches a second value when it is determined that the first image and the second image have no difference.

6. A non-transitory computer-readable medium having computer-executable instructions that, upon execution of the instructions by a processor of a computer, cause the computer to function as the difference detection device of claim 1.

7. A difference detection device comprising:
a processor;

a storage medium having computer program instructions stored thereon, when executed by the processor, perform to:
based on association among a first image and a second image captured at different times and illustrating a substantially identical space and encoding information of each of the first image and the second image, detect difference between a third image and a fourth image captured at different times and illustrating a substantially identical space,
wherein the encoding information is information acquired from data including the first image encoded and data including the second image encoded, before inverse transform processing is executed in decoding processing executed on each of the first image and the second image; and
a transform unit configured to transform the encoding information into an image format,
wherein the computer program instructions further perform to detect the difference between the third image and the fourth image based on the encoding information transformed into the image format.

* * * * *